Patented Jan. 2, 1923.

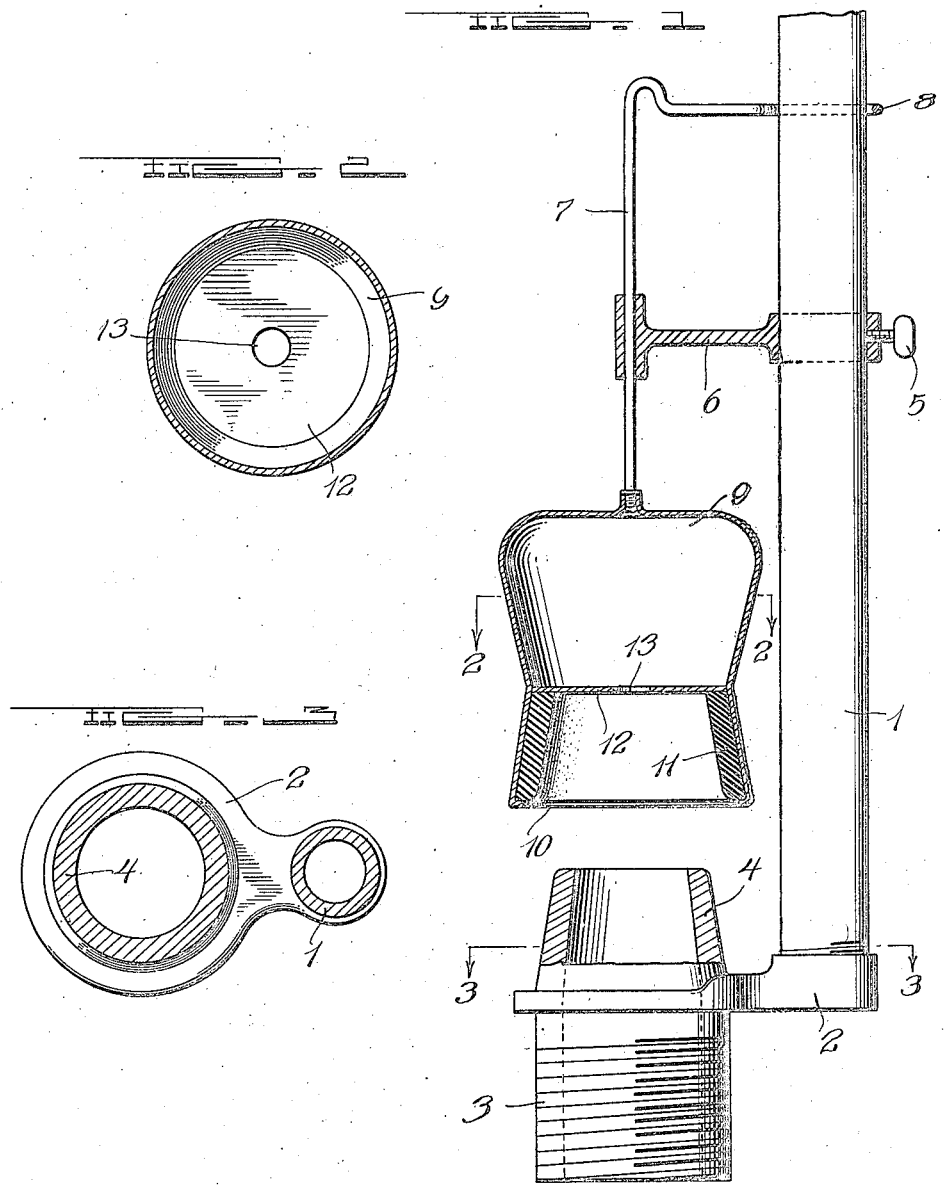

1,440,469

UNITED STATES PATENT OFFICE.

MARTIN WALTER KELLER, OF PINE BLUFF, ARKANSAS.

FLUSH VALVE.

Application filed April 17, 1922. Serial No. 553,367.

*To all whom it may concern:*

Be it known that I, MARTIN W. KELLER, a citizen of the United States, residing at Pine Bluff, in the county of Jefferson and State of Arkansas, have invented certain new and useful Improvements in a Flush Valve, of which the following is a specification.

My invention relates to flush valves for water closets and has particular reference to a valve of the float type. The primary object of the invention is to provide a valve of this character so constructed and arranged as to be absolutely noiseless in closing off.

Other objects are the provision in a valve of this character, of improved and novel valve seating means, and mounting of the component valve elements.

With these and such other objects in view as will be apparent from the description, my invention resides in the novel construction, combination, and arrangement of parts hereinafter described and claimed, and illustrated in the accompanying drawings, of which;

Figure 1 is an elevation, partly in section, of a valve constructed in accordance with the invention, Figure 2 a horizontal section on line 2—2 of Figure 1, and Figure 3, a horizontal section on line 3—3 of Figure 1.

As illustrated, 1 designates the usual tank overflow pipe adapted for mounting in a closet tank, communicating at its lower end by means of a lateral extension 2, with a threaded pipe section 3 adapted to be secured to the closet flush pipe (not shown). Above the extension 2 the pipe section 3 is tapered in frusto-conical formation as at 4, to provide a valve seat.

Vertically adjustable by means of a set screw 5, on the over flow pipe 1, is a bracket 6 carrying in guiding relation a valve rod 7 bent laterally at its upper end to form a guide member 8 loosely encircling the overflow pipe. Secured on the lower end of the valve rod is a bell shaped float 9, the lower end of which is flared to conform with the shape of the valve seat 4, and is inturned to form an annular flange 10 for the reception of a rubber washer 11 within the float. Directly above the washer the float is provided with a bottom 12, suitably secured therein, and provided with a relatively small central aperture 13.

Float 9 is of course hollow and is disposed in alignment with the valve seat 4 so that when lowered, the washer 11 will engage the seat. Any suitable means of operating the valve may be provided, which forming no part of the present invention, is not illustrated.

In operation, when the tank is full of water the weight of same will keep the float positioned over the valve seat with the valve closed. When valve is opened the air within the float will buoy same allowing it to be gradually lowered with the fall of the water level, onto the valve seat, closing the valve, as the suction pulls the float over the seat. The float bottom 12 is in the form of a flat plate, which effectually prevents bubble formation and the aperture 13 acts as a condensation relief, allowing whatever water may have splashed within the float chamber, to escape. Due to the tapered formation of the valve seat and washer the valve is closed gradually, and the elimination of bubbles prevents any occurrence of the objectionable noise attendant on the operation of valves hitherto.

The guide member 8 keeps the valve from turning on its seat, thus insuring perfect seating at all times. The various elements of the invention may be made of any suitable material adapted to the requirements, and while I have illustrated and described certain details, I desire it to be understood that I do not intend these as limitations, but that any such may be used as will fall within the scope of the invention as claimed.

I claim:—

1. In a flush valve, an air float, a flared annular extension integral therewith and extending beneath the float, an inwardly projecting flange on the lower end of said extension, a tapered valve seat, an apertured plate comprising the bottom of said float, a washer for engaging said valve seat, said washer being secured in said float extension between the flange and bottom plate.

2. In a flush valve, an air float, a flared annular extension thereon extending below the float and inturned around its lower end, a tapered valve seat, a seat engaging washer mounted in said extension on the inturned lower end thereof, for closing the valve, and a bubble preventing plate forming the bottom of said float disposed above said washer.

In testimony whereof I affix my signature.

MARTIN WALTER KELLER.